United States Patent
Kim et al.

(10) Patent No.: US 8,111,635 B2
(45) Date of Patent: Feb. 7, 2012

(54) SERVER, TERMINAL, AND METHOD FOR SUPPORTING MOBILITY

(75) Inventors: Jae-hoon Kim, Seoul (KR); Ji-hoon Lee, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 143 days.

(21) Appl. No.: 12/207,381

(22) Filed: Sep. 9, 2008

(65) Prior Publication Data
US 2009/0225674 A1 Sep. 10, 2009

(30) Foreign Application Priority Data
Mar. 10, 2008 (KR) .................. 10-2008-0022003

(51) Int. Cl.
*H04L 12/28* (2006.01)
(52) U.S. Cl. ........ 370/258; 370/328; 370/338; 370/351; 709/221; 709/238; 455/432.1; 455/437; 455/456.1
(58) Field of Classification Search .......... 709/201–203, 709/220–222, 227–229; 370/328, 329, 331–334, 370/338, 351; 455/432.1, 433, 435.1, 436, 455/437, 456.1
See application file for complete search history.

(56) References Cited

U.S. PATENT DOCUMENTS

| | | | |
|---|---|---|---|
| 6,646,999 B1 * | 11/2003 | Kato et al. | 370/329 |
| 7,643,459 B2 * | 1/2010 | Miller et al. | 370/338 |
| 2003/0031156 A1 * | 2/2003 | Omae et al. | 370/338 |
| 2003/0053427 A1 * | 3/2003 | Kanda et al. | 370/328 |
| 2004/0083306 A1 * | 4/2004 | Gloe | 709/245 |
| 2006/0274665 A1 | 12/2006 | Hatori et al. | |
| 2008/0194271 A1 * | 8/2008 | Bedekar et al. | 455/456.2 |
| 2008/0310302 A1 * | 12/2008 | Detwiler et al. | 370/230 |

FOREIGN PATENT DOCUMENTS

| | | |
|---|---|---|
| EP | 1 646 191 A1 | 4/2006 |
| JP | 2000-013823 A | 1/2000 |
| JP | 2002-247634 A | 8/2002 |
| JP | 2002-369239 A | 12/2002 |
| KR | 1020060113775 A | 11/2006 |
| KR | 1020070061161 A | 6/2007 |

\* cited by examiner

*Primary Examiner* — Christopher Grey
(74) *Attorney, Agent, or Firm* — NSIP Law

(57) ABSTRACT

A server, terminal, and method for supporting mobility in a network are provided. A server includes a storage which stores a double chord lookup table including server search information based on identifiers and location information of terminals on a network, a controller which finds a server for providing an optimal routing path between a receiving terminal and a transmitting terminal for sending a packet to the receiving terminal, using the double chord lookup table, where a trigger including an identifier and location information for identifying the receiving terminal is received from the receiving terminal, and a communicator which reports the location of the found server to the receiving terminal and the transmitting terminal.

12 Claims, 7 Drawing Sheets

FIG.3

| SERVER | MANAGEMENT RANGE | MANAGEMENT NODE |
|---|---|---|
| 1 | 1a ~ 1z | (1a, R1)・・・ |
| 2 | 2a ~ 2z | ・・・ |
| 3 | 3a ~ 3z | ・・・ |

~310

| SERVER | MANAGEMENT RANGE | MANAGEMENT NODE |
|---|---|---|
| 1 | 1a ~ 1z | (1a, R2) |
| 2 | 2a ~ 2z | ・・・ |
| 3 | 3a ~ 3z | ・・・ |

| SERVER(ID) | SERVER(LOC) | ID MANAGEMENT RANGE | LOC MANAGEMENT RANGE | MANAGEMENT NODE |
|---|---|---|---|---|
| 1 | X | 1a ~ 1z | Xa ~ Xz | (1a, Xa), (1b, Xb)... |
| 2 | Y | 2a ~ 2z | Ya ~ Yz | (2a, Ya), (2b, Yb)... |
| 3 | Z | ... | ... | ... |
| | | | | |

~410

| SERVER(ID) | SERVER(LOC) | ID MANAGEMENT RANGE | LOC MANAGEMENT RANGE | MANAGEMENT NODE |
|---|---|---|---|---|
| 1 | X | 1a ~ 1z | Xa ~ Xz | (1a, Xa →Ya)... |
| 2 | Y | ... | Ya ~ Yz | (1a, Ya)... |
| 3 | Z | ... | ... | ... |

~420

SERVER, TERMINAL, AND METHOD FOR SUPPORTING MOBILITY

CROSS REFERENCE TO RELATED APPLICATIONS

This application claims the benefit under 35 U.S.C. §119(a) of a Korean Patent Application No. 10-2008-0022003, filed on Mar. 10, 2008 in the Korean Intellectual Property Office, the disclosure of which is incorporated herein in its entirety by reference.

TECHNICAL FIELD

The following description relates to a wireless communication system, and more particularly, to a server, terminal, and method for providing routing for a terminal moving in a network.

BACKGROUND

An Internet protocol (IP) address, which is a core element of the Internet, is being used in a global Internet space. An IP address may be a unique endpoint identifier used to interface by a certain device connected to a network. An IP address may include the meaning of a location identifier indicating a location of a device on the network. That is, the IP address may structurally include the meanings of both an identifier and a locator.

In the Internet of the future, it is believed that mobility will be emphasized due to miniaturization and intelligence of devices along with the expansion of a wireless zone. While on the move, it may be desirable to have a terminal identifiable irrespective of its location and maintain a constant communication session. However, since a conventional IP address has the meanings of both an identifier for identifying a terminal and a locator indicating a location of the terminal, the identifier of the terminal may be a subject of communication changes where the IP address changes. In this case, a communication session in progress may be disconnected and seamless service may not be continued. Accordingly, there has been an active research to separate the IP address structure into an identifier and a locator.

SUMMARY

In one general aspect, there is provided a server, terminal, and system for providing routing using a double chord lookup table based on identifiers and locations of terminals.

In another general aspect, a server for supporting mobility comprises a storage which stores a double chord lookup table comprising server search information based on identifiers and location information of terminals on a network, a controller which finds a server for providing an optimal routing path between a receiving terminal and a transmitting terminal for sending a packet to the receiving terminal, using the double chord lookup table, where a trigger comprising an identifier and location information for identifying the receiving terminal is received from the receiving terminal, and a communicator which reports a location of the found server to the receiving terminal and the transmitting terminal.

The double chord lookup table may comprise a predetermined range of identifiers and a predetermined range of location information to be managed by each server on the network and be shared with other servers on the network.

The predetermined range of identifiers may indicate key values generated using the identifiers of the terminals on the network and the predetermined range of location information may indicate key values generated using the location information of the terminals.

The controller may determine whether an address included in the trigger changes due to movement of the receiving terminal where the trigger is received through the communicator, find a server managing the changed address from the double chord lookup table, and report a location of the found server to the receiving terminal and the transmitting terminal.

The controller may update the double chord lookup table using the identifier and an address included in the trigger received from the receiving terminal.

In still another general aspect, a terminal for transmitting and receiving a packet comprises a processor which controls packet transmission and reception and a network interface that transmits a trigger comprising an identifier and location information for identifying a receiving terminal on a network and receives a packet corresponding to the identifier through the network.

The network interface may receive the packet sent from another terminal through a server for providing an optimal routing path between the terminal and another terminal, upon receipt of a message that indicates a location of the server which is found using a double chord lookup table comprising server search information based on identifiers and location information of terminals on the network.

The double chord lookup table may comprise identifiers and location information in a management range of each server on the network and be shared with other servers on the network.

The identifiers may indicate key values generated using the identifiers of the terminals on the network, and the location information indicate key values generated using the location information of the terminals.

Where the terminal for receiving the packet moves and an address of the receiving terminal changes while the processor controls the network interface for packet transmission, the processor may control the network interface to continue the packet transmission through a server indicated by a message upon receipt of the message which indicates a location of a server for providing an optimal routing path between the moved receiving terminal and the terminal.

In yet another general aspect, a method for supporting mobility comprises receiving a trigger including an identifier and location information from a receiving terminal, finding a server for providing an optimal routing path between the receiving terminal and a transmitting terminal for sending a packet to the receiving terminal, using a double chord lookup table comprising server search information based on identifiers and location information on a network, and reporting a location of the found server to the receiving terminal and the transmitting terminal.

The double chord lookup table may comprise identifiers and location information in a management range of each server on the network and be shared by servers on the network.

The identifier may indicate a key value generated using identifiers of terminals on the network and the location information may indicate a key value generated using location information of the terminals.

The method may further comprise updating the double chord lookup table using the identifier and location information comprised in the trigger received from the receiving terminal.

The finding of the server may comprise determining whether an address comprised in the trigger changes due to a movement of the receiving terminal and finding a server managing the changed address from the double chord lookup table.

The finding of the server may further comprise sending a packet from the transmitting terminal to the location of the found server where the receiving terminal moves.

Other features will become apparent to those skilled in the art from the following detailed description, which, taken in conjunction with the attached drawings, discloses exemplary embodiments of the invention

BRIEF DESCRIPTION OF THE DRAWINGS

FIG. 3 is a diagram of tables illustrating a structure of a conventional single chord lookup table.

FIG. 4 is a diagram of tables illustrating a structure of a double chord lookup table according to an exemplary embodiment.

Throughout the drawings and the detailed description, unless otherwise described, the same drawing reference numerals will be understood to refer to the same elements, features, and structures. The elements may be exaggerated for clarity and convenience.

DETAILED DESCRIPTION

The following detailed description is provided to assist the reader in gaining a comprehensive understanding of the media, apparatuses, methods and/or systems described herein. Accordingly, various changes, modifications, and equivalents of the systems, methods, apparatuses and/or media described herein will be suggested to those of ordinary skill in the art. Also, description of well-known functions and constructions are omitted to increase clarity and conciseness.

Figure 1A:
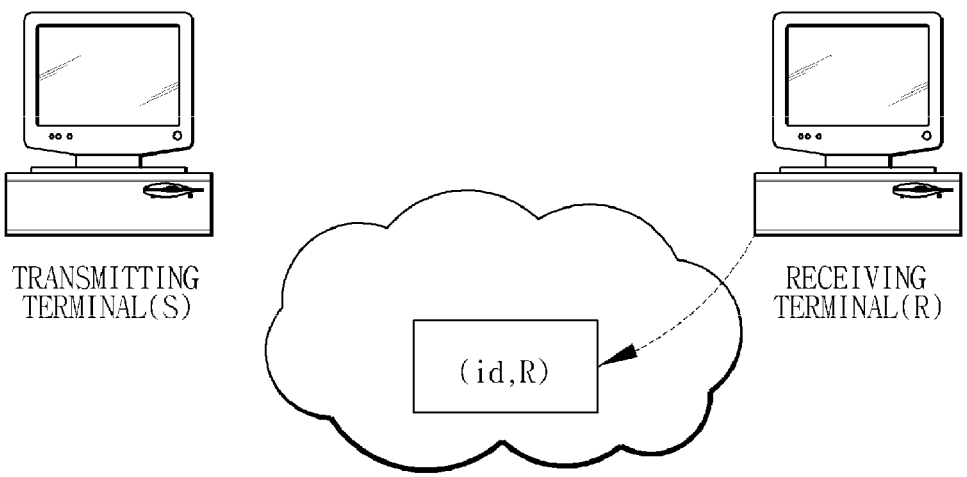
FIGS. 1A and 1B are diagrams illustrating a communication process between two terminals according to an exemplary embodiment.
Figure 1B:
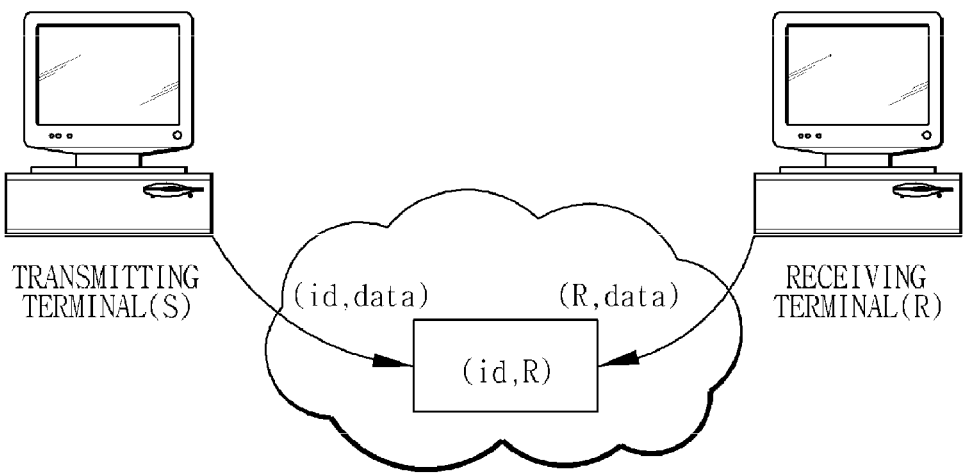

FIGS. 1A and 1B illustrate a communication process between two terminals in a communication system, for example, a rendezvous communication system, according to an exemplary embodiment.

The communication system according to an exemplary embodiment performs rendezvous-based communication. In a rendezvous-based communication network, terminals perform transmission as well as reception functions. In this case, one terminal may be either a transmitting terminal or a receiving terminal. For convenience of explanation, it is assumed that a terminal for transmitting a packet is called a transmitting terminal and a terminal for receiving a packet is called a receiving terminal.

In the rendezvous-based communication, a basic packet form may be expressed by (id, data) including an identifier and data. Here, the identifier id may be a logical identifier of m bits for identifying a receiving terminal and the data may be a payload, for example, a payload of a conventional IP packet.

In the rendezvous-based communication, a receiving terminal may use a trigger to indicate the interest for a packet. The trigger may be indicated in a simple form (id, address). Here, all packets having the identifier id are sent to a receiving terminal having the address.

FIG. 1A illustrates an example in which a receiving terminal transmits a trigger (id, R) into a network. FIG. 1B illustrates an example in which the network sends a packet to the receiving terminal having the address R where a transmitting terminal sends the packet having the identifier id to the network.

Figure 2:
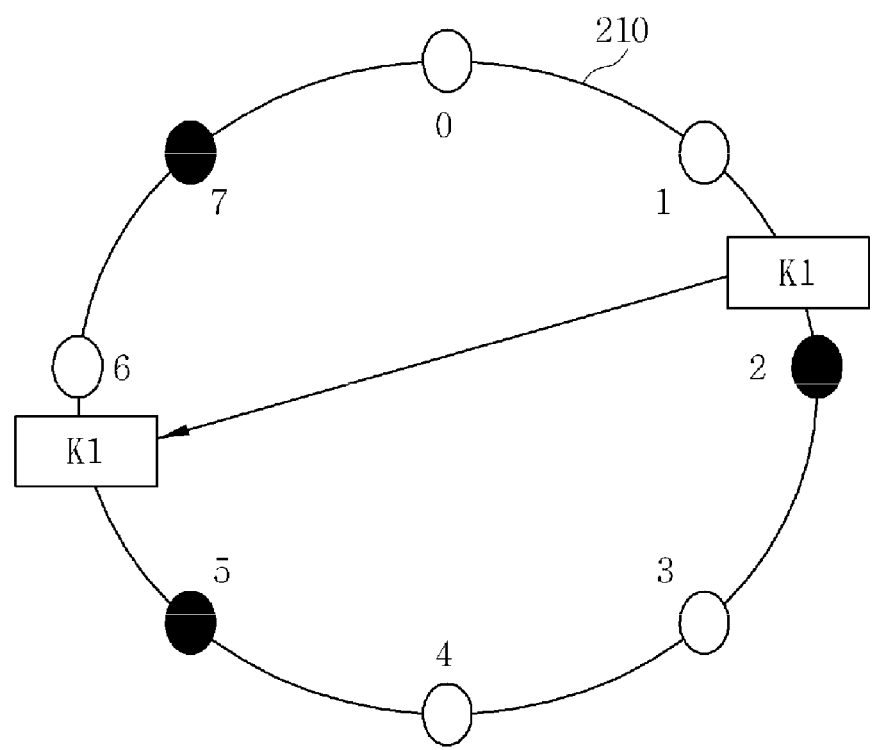
FIG. 2 is a diagram illustrating a chord lookup protocol according to an exemplary embodiment.

FIG. 2 illustrates an exemplary chord lookup protocol 210.

According to an exemplary embodiment, a rendezvous communication may be performed by mapping identifiers to servers on the network. Each server manages a predetermined range of logical identifiers. Accordingly, there is one server responsible for managing a predetermined identifier id on the network.

Where a trigger (id, address) is transmitted, also referred to as being inserted, the transmitted trigger may be stored in a server responsible for the identifier id. Where a packet for the identifier id is sent, the packet is routed to the server responsible for the identifier id. Accordingly, all receiving terminals interested in the packet for the identifier id may receive a predetermined service by receiving the packet.

According to an exemplary embodiment, the network may be implemented through a chord lookup protocol. The chord lookup protocol is a protocol structured with a ring-type distributed hash table, which assigns key values of data generated in a hash method between nodes in a circular address space.

Here, the data key values indicate a predetermined range of identifiers id. The identifiers id may be mapped to servers managing the identifiers. The server is called a successor of an identifier id. For example, a server 2 may be responsible for identifiers 0, 1, and 2, a server 5 may be responsible for identifiers 3, 4, and 5, and a server 7 may be responsible for identifiers 6 and 7.

Referring to FIG. 2, where a receiving terminal K1 moves and its address changes from R to R', the receiving terminal K1 updates an existing trigger from (id, R) to (id, R'), so as to notify a network server that a location has been changed. For example, a server receiving and storing the trigger may send a packet received from a transmitting node to a moved receiving node by updating an address of the moved receiving node.

However, even where the receiving terminal moves, and its location changes, the receiving terminal may receive packets for an identifier id only through the server responsible for the identifier id, leading to inefficient routing. For example, where the transmitting terminal and the receiving terminal are near each other but the server storing the trigger is remote, routing may be inefficient.

FIG. 3 illustrates a structure of a conventional single chord lookup table.

As shown in FIG. 3, logical identifier-based chord lookup tables 310 and 320 include server-by-server management ranges of identifiers and management node information. Hereinafter, the conventional identifier-based chord lookup table is called a single chord lookup table based on identifiers. A server identifier is used to identify a server on the network.

In FIG. 3, the management range indicates logical identifiers of receiving terminals mapped on a server-by-server basis. The management nodes include identifiers and address information of receiving terminals having identifiers mapped to the servers.

Referring to FIG. 3, the server 1 manages identifiers 1*a* to 1*z*, and terminal information of receiving servers interested in the identifiers 1a to 1z in the form of (1a, R1), (1b, R2), etc., as management node information.

Where a location of the receiving terminal identified by the identifier 1a changes from R1 to R2, the receiving terminal 1 transmits a trigger of (1a, R2) into the network and hence the signal chord lookup table is updated to a single chord lookup table based on identifiers as indicated by reference numeral 320. However, the location of the receiving terminal is only updated in the single chord lookup table and communication between the transmitting terminal and the receiving terminal is performed through the server 1 managing the identifier 1a. In this case, routing may be inefficient, as described above.

FIG. 4 illustrates a structure of a double chord lookup table according to an exemplary embodiment.

In FIG. 4, a server ID is an identifier for identifying a server in an identifier-based chord ring. A server LOC is an identifier for identifying a server in a location-based chord ring. An ID management range indicates a predetermined range of identifier information for terminals on the network to be managed by mapping to servers. An LOC management range is a predetermined range of location information for the terminals on the network to be managed by mapping to the servers. The management nodes indicate identifiers and location information (addresses) of terminals to be managed in a range of identification information to be managed by each server.

In a double chord lookup table 410 of FIG. 4, servers on the same line are physically the same and are separated by server identifiers in order to indicate logical locations in a double chord ring. For example, a server 1 and a server X are physically the same but are separated since the server 1 and the server X are mapped to identifiers 1a to 1z in an identifier-based chord ring and to location information Xa to Xz in a location-based chord ring.

Referring to FIG. 4, a predetermined range of location information and a predetermined range of identifiers are mapped on a server-by-server basis in the double chord lookup table according to an exemplary embodiment.

It is assumed that a location of a receiving terminal identified by the identifier 1a changes and its address changes from Xa to Ya. The receiving terminal reports the changed location by transmitting a trigger (1a, Ya) into the network. Since the location of the receiving terminal is not in the management range of the server 1, an operation is performed to find a server, located near the receiving terminal, for managing the location of the receiving terminal. The server Y managing a location range of the moved receiving terminal is found by referring to the double chord lookup table 410.

The server 1 receiving the trigger may change the address of the receiving terminal from Xa to Ya in the double chord lookup table and send the trigger of the receiving terminal to the server Y. Alternatively, the server Y may directly receive the trigger from the receiving terminal. Then, the trigger of the receiving terminal is added to management node information of the server Y and hence the double chord lookup table 410 is updated to a double chord lookup table 420.

Then, the server 1 reports a location of the server Y to the transmitting terminal and the receiving terminal, such that the transmitting terminal provides the server Y with a packet for the identifier 1a. Then, the server Y transfers the packet to the receiving terminal sending the trigger (1a, Ya). Therefore, a routing may be efficiently provided by performing communication through the server Y close to the receiving terminal whose location has been changed. The transmitting terminal may send the packet to the receiving terminal without detecting an actual location of the receiving terminal.

Figure 5:
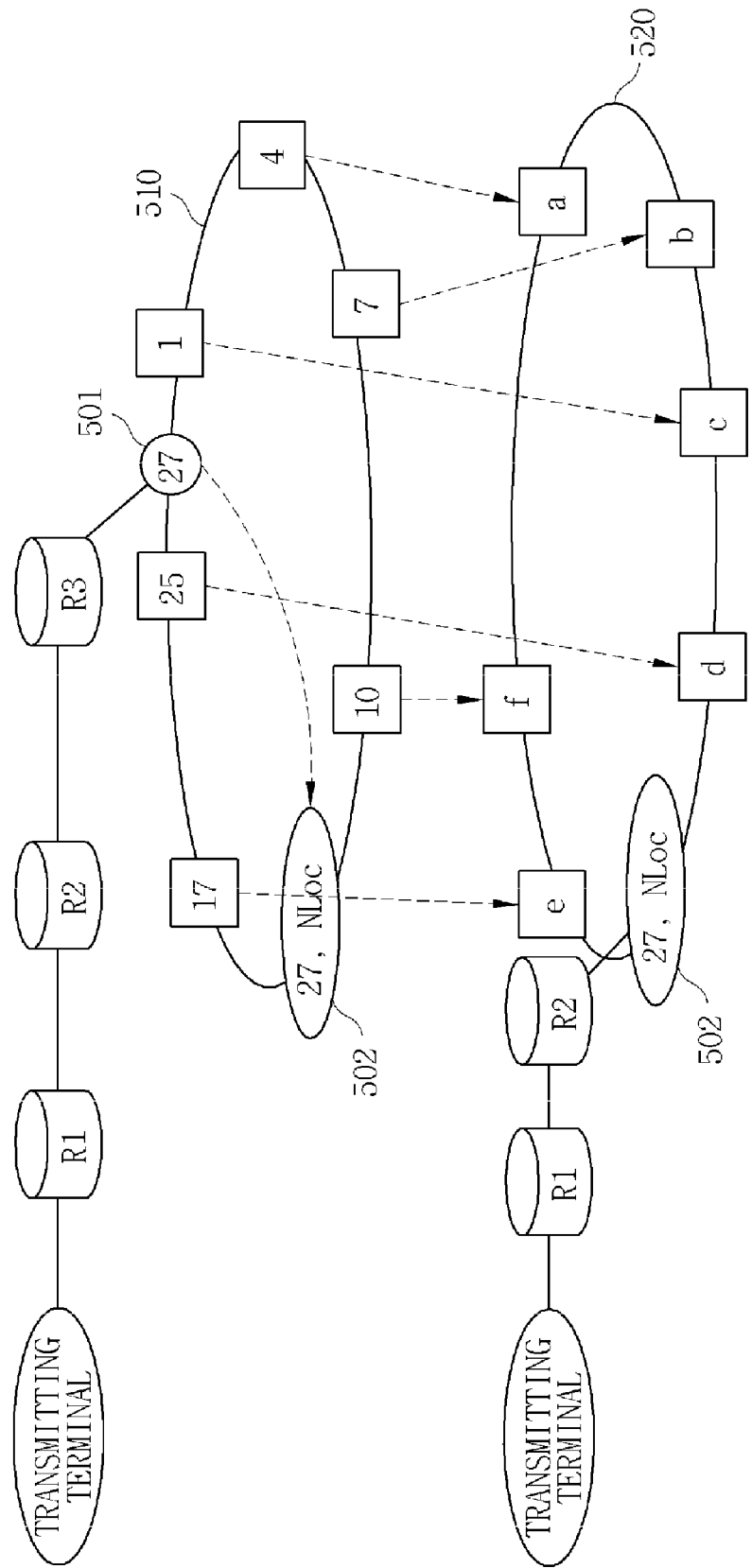
FIG. 5 is a diagram illustrating a network to which a double chord lookup table is applied according to an exemplary embodiment.

FIG. 5 illustrates a network to which a double chord lookup table is applied according to an exemplary embodiment.

FIG. 5 shows that one physical server is located on a double chord ring where the double chord lookup table is implemented. In FIG. 5, a chord ring 510 is an identifier-based chord ring and a chord ring 520 is a location-based chord ring. A number in a rectangular block denotes a server and a number 27 in a circle denotes a receiving terminal 501.

In a connection between a server of the chord ring 510 and a server of the chord ring 520 as indicated by the dotted line, the connected servers are physically the same but are separated to manage a predetermined range of identifiers and a predetermined range of location information.

Where the receiving terminal 501 having the identification number 27 moves while being managed by a server 25, an address of the moved receiving terminal changes, as indicated by a reference numeral 502. Thus, where a packet is sent using only the identifier-based chord ring 510, the routing may be inefficient.

However, according to an exemplary embodiment, a server e managing the location of the receiving terminal 501 by referring to the location-based chord lookup table on the location-based chord ring 520 is responsible for packet transmission to the receiving terminal 501 where the receiving terminal 501 moves and its location changes.

Even where the receiving terminal 501 moves, a routing may be efficiently provided. For example, a packet may be conventionally received from the transmitting terminal through three routers R1, R2, and R3, but may be received through two routers R1 and R2 where the location-based chord lookup table is used according to an exemplary embodiment.

Figure 6:
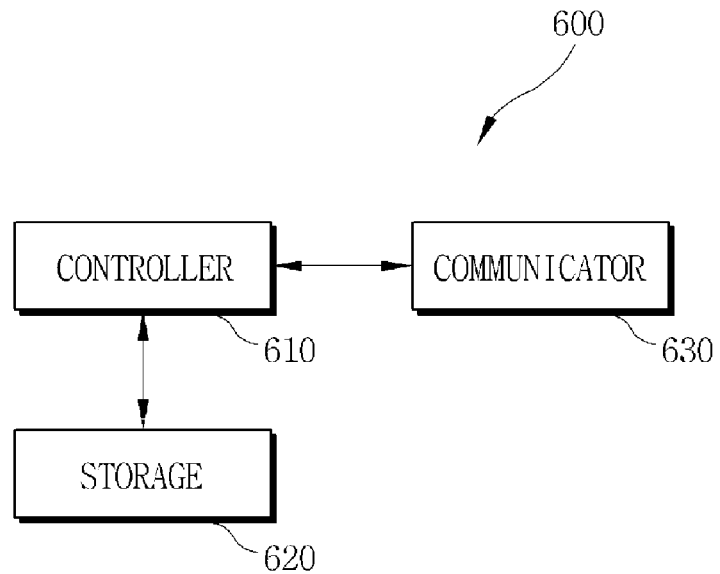
FIG. 6 is a block diagram illustrating a server according to an exemplary embodiment.

FIG. 6 illustrates a server 600 for supporting mobility according to an exemplary embodiment.

For example, the server 600 may be used a rendezvous communication system according to an exemplary embodiment. As illustrated in FIG. 6, the server 600 comprises a controller 610, a storage 620, and a communicator 630.

The storage 620 stores a double chord lookup table including server search information based on identifiers and locations of terminals on a network. As described with reference to FIG. 4, the exemplary double chord lookup table includes a predetermined range of identifiers and a predetermined range of location information to be managed by each server on the network and is shared with other servers on the network. The predetermined range of identifiers indicates key values generated using the identifiers of the terminals on the network and the predetermined range of location information indicates key values generated using the location information of the terminals.

Where a trigger including an identifier for identifying a receiving terminal and its location information is received from the receiving terminal, the controller 610 finds a server for providing an optimal routing path between the receiving terminal and a transmitting terminal sending a packet thereto using the double chord lookup table stored in the storage 620. The controller 610 controls the communicator 630 to report the found server location to the receiving terminal and the transmitting terminal.

Where the trigger is received through the communicator 630, the controller 610 checks whether an address included in the trigger has been changed by movement of the receiving terminal and finds a server managing the changed address in the double chord lookup table. The controller 610 controls the communicator 630 to report the found server location to the receiving terminal and the transmitting terminal.

Also, the controller 610 may update the double chord lookup table using the identifier and address included in the trigger received from the receiving terminal.

Figure 7:
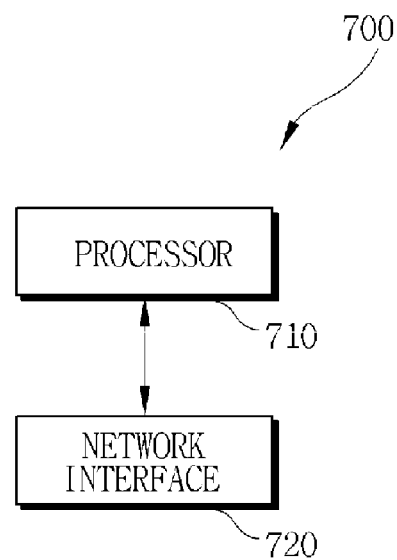
FIG. 7 is a block diagram illustrating a terminal according to an exemplary embodiment.

FIG. 7 illustrates a terminal 700 according to an exemplary embodiment.

The terminal 700 for transmitting and receiving a packet through, for example, a rendezvous communication network comprises a processor 710 and a network interface 720. The terminal 700 may be implemented in various forms having communication functions of a PDA, a mobile phone, a computer, and the like.

The processor 710 controls packet transmission and reception. The network interface 720 transmits a trigger including an identifier and location information into a network and receives a packet corresponding to the identifier. The network interface 720 receives data sent from another terminal (not shown) through a server indicated by a message that indicates the location of a server for providing an optimal routing path between the terminal 700 and the other terminal, found using a double chord lookup table including server search information based on identifiers and locations of the terminals on the network, upon receipt of the message.

Here, the double chord lookup table includes a predetermined range of identifiers and a predetermined range of location information to be managed by each server on the network and is shared with other servers on the network. The predetermined range of identifiers indicates key values generated using identifiers of the terminals on the network and the predetermined range of location information indicates key values generated using location information of the terminals.

Where the terminal 700 operates as a transmitting terminal, the following operation may be performed. Where a predetermined receiving terminal moves and its address changes while the processor 710 controls the network interface 720 to perform packet transmission, the receiving terminal sends a trigger including its identifier and location information to the network interface 720. The server receiving the trigger updates the double chord lookup table using the trigger and sends a message indicating a location of a server for providing an optimal routing path between the receiving terminal and the transmitting terminal to the terminal 700.

Where the terminal 700 receives the message indicating the location of the server for providing the optimal routing path between the moved receiving terminal and the transmitting terminal, the processor 710 may control the network interface 720 to continue the packet transmission through the server indicated by the message.

Figure 8:
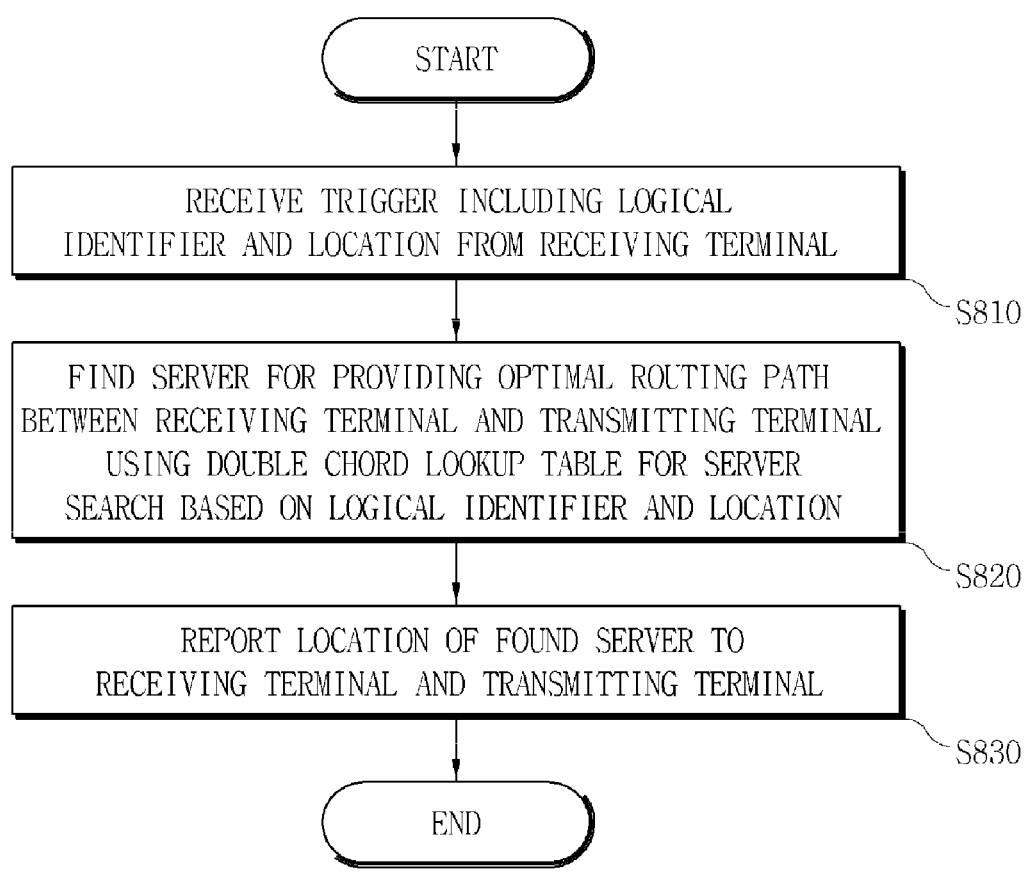
FIG. 8 is a flowchart illustrating an operation of a system including a server and a terminal according to an exemplary embodiment.

FIG. 8 illustrates an operation of a system including a server and a terminal according to an exemplary embodiment.

In operation S810, a trigger including a logical identifier and location information is received from a receiving terminal.

In operation S820, a server for providing an optimal routing path between the receiving terminal and a transmitting terminal is found using a double chord lookup table including server search information based on logical identifiers and location information. A server search step may be performed through the following process. The trigger including the identifier and address is received from a predetermined receiving node. Then, the server managing the address included in the trigger may be found by an identifier-based search process and address information-based search process for the double chord lookup table.

In operation S830, the found server location is reported to the receiving terminal and the transmitting terminal.

According to certain embodiments described above, mobility may be efficiently provided for terminals on a network using a new address system in which an identifier and location information are separated in a communication system, for example, a rendezvous communication system.

According to certain embodiments described above, a terminal may efficiently transmit and receive data by finding a server for providing an optimal routing path between a receiving terminal and a transmitting terminal using a double chord lookup table in a corresponding server without performing a special, complex algorithm.

The methods and/or operations described above may be recorded, stored, or fixed in one or more computer-readable media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A server for supporting mobility in a rendezvous-based communication system, comprising:

a storage which stores a double chord lookup table comprising server search information based on logical identifiers and location information of terminals on a network;

a controller which finds a server for providing an optimal routing path between a receiving terminal and a transmitting terminal for sending a packet to the receiving terminal, using the double chord lookup table, in response to receiving a trigger comprising a logical identifier for identifying the receiving terminal and location information for the receiving terminal from the receiving terminal to indicate interest for the packet; and a communicator which reports a location of the found server to the receiving terminal and the transmitting terminal, such that the packet is transmitted between the receiving terminal and the transmitting terminal through the found server, wherein the server search information comprises double server identifier for each server on a double chord ring comprising an identifier-based chord ring and a location-based chord ring, a predetermined range of logical identifiers and a predetermined range of location information to be managed by each server on the network, wherein the double server identifiers indicate physically same server and are separated in order to indicate locations respectively on the double chord ring, and wherein the logical identifiers are key values generated using the logical identifiers of the terminals on the network, the location information is key values generated using the location information of the terminals, and key values are generated according to a hash method.

2. The server of claim 1, wherein the double chord lookup table is shared with other servers on the network.

3. The server of claim 1, wherein the controller determines whether an address comprised in the trigger changes due to movement of the receiving terminal where the trigger is received through the communicator, finds a server managing the changed address from the double chord lookup table, and reports a location of the found server to the receiving terminal and the transmitting terminal.

4. The server of claim 1, wherein the controller updates the double chord lookup table using the logical identifier and an address comprised in the trigger received from the receiving terminal.

5. A terminal for transmitting and receiving a packet in a rendezvous-based communication system, comprising:
   a processor which controls packet transmission and reception; and
   a network interface which transmits a trigger comprising a logical identifier for identifying a receiving terminal and location information for the receiving terminal on a network to indicate interest for a packet and receives the packet corresponding to the logical identifier through the network,
   wherein the network interface receives the packet sent from another terminal through a server for providing an optimal routing path between the terminal and another terminal, upon receipt of a message that indicates a location of the server which is found using a double chord lookup table comprising server search information based on logical identifiers and location information of terminals on the network and
   wherein the server search information comprises double server identifier for each server on a double chord ring comprising an identifier-based chord ring and a location-based chord ring, a predetermined range of logical identifiers and a predetermined range of location information to be managed by each server on the network,
   wherein the double server identifiers indicate physically same server and are separated in order to indicate locations respectively on the double chord ring, and
   wherein the logical identifiers are key values generated using the logical identifiers of the terminals on the network, the location information is key values generated using the location information of the terminals, and key values are generated according to a hash method.

6. The terminal of claim 5, wherein the double chord lookup table comprises logical identifiers and location information in a management range of each server on the network and is shared with other servers on the network.

7. The terminal of claim 5, wherein where the terminal for receiving the packet moves and an address of the receiving terminal changes while the processor controls the network interface for packet transmission, the processor controls the network interface to continue the packet transmission through a server indicated by a message upon receipt of the message which indicates a location of a server for providing an optimal routing path between the moved receiving terminal and the terminal.

8. A method for supporting mobility in the rendezvous-based communication system, comprising:
   receiving a trigger comprising a logical identifier and location information from a receiving terminal to indicate interest for a packet;
   finding a server for providing an optimal routing path between the receiving terminal and a transmitting terminal for sending the packet to the receiving terminal, using a double chord lookup table comprising server search information based on logical identifiers and location information of terminals on a network; and
   reporting a location of the found server to the receiving terminal and the transmitting terminal, such that the packet is transmitted between the receiving terminal and the transmitting terminal through the found server,
   wherein the server search information comprises double server identifier for each server on a double chord ring comprising an identifier-based chord ring and a location-based chord ring, a predetermined range of logical identifiers and a predetermined range of location information to be managed by each server on the network,
   wherein the double server identifiers indicate physically same server and are separated in order to indicate locations respectively on the double chord ring, and
   wherein the logical identifiers are key values generated using the logical identifiers of the terminals on the network, the location information is key values generated using the location information of the terminals, and key values are generated according to a hash method.

9. The method of claim 8, wherein the double chord lookup table is shared by servers on the network.

10. The method of claim 8, further comprising:
    updating the double chord lookup table using the logical identifier and location information comprised in the trigger received from the receiving terminal.

11. The method of claim 8, wherein the finding of the server comprises:
    determining whether an address comprised in the trigger changes due to a movement of the receiving terminal; and
    finding a server managing the changed address from the double chord lookup table.

12. The method of claim 11, wherein the finding of the server further comprises:
    sending a packet from the transmitting terminal to the location of the found server where the receiving terminal moves.

* * * * *